Patented Feb. 22, 1927.

1,618,415

UNITED STATES PATENT OFFICE.

GEORGE HOLLAND ELLIS, OF SPONDON, NEAR DERBY, ENGLAND, ASSIGNOR TO AMERICAN CELLULOSE AND CHEMICAL MANUFACTURING COMPANY LIMITED, A CORPORATION OF DELAWARE.

DYEING MATERIALS COMPRISING CELLULOSE ACETATE AND PRODUCTS PRODUCED.

No Drawing. Application filed February 2, 1925, Serial No. 6,460, and in Great Britain April 4, 1924.

This invention relates to the dyeing (which term likewise includes printing and stencilling) of artificial filaments, threads, fabrics, films or other products made from or containing cellulose acetate, all hereinafter in the claims included in the term materials comprising cellulose acetate.

It has been proposed to use nitro derivatives of simple organic primary amino bases as components in the dyeing of cellulose acetate by processes of diazotization and development. Such nitro derivatives of primary amino bodies were capable of absorption by the cellulose acetate from aqueous or acid baths, and very often imparted to the acetyl cellulose yellow colorations. Such colorations were, however, of little use as such, that is without further treatment such as diazotization and development, on account of the defect of being easily volatilized from the material. Examples of such nitro derivatives which impart yellow colorations to cellulose acetate are meta-nitraniline, metanitro-ortho-anisidine, parachlor-ortho-nitraniline, metanitroparatoluidine.

I have now found that by employing unsulphonated nitro derivatives of diarylamines, containing or not containing in their structure other substituent groups, such for instance, as —OH, —NH$_2$ or Cl groups, colorations can be obtained on cellulose acetate which possess technical advantages over those derived from the above mentioned compounds, and that such nitro derivatives of diarylamines although being regarded in relation to other fibres rather as intermediates than as coloring matters, may be usefully employed directly as dyestuffs for acetyl cellulose.

According to the present invention, therefore, I employ for the dyeing, printing or stencilling of textile or other materials of or containing cellulose acetate, unsulphonated nitro derivatives of diarylamines, said derivatives containing or not containing other substituent groups such for instance as —OH, —NH$_2$ or Cl.

Said derivatives may contain one nitro group or may contain two nitro groups whether in the 2:4 position or the 4:4' position, or in other positions, or may contain more than two nitro groups. All such unsulphonated nitro derivatives of diarylamines, whether containing one or more nitro groups and whether or not containing in their structure other substituent groups, such for instance as —OH, —NH$_2$ or Cl groups, are hereinafter in the claims included in the term unsulphonated nitro derivative of a diarylamine.

Some examples of compounds useful for the purpose of the present invention are:

2:4 dinitro diphenylamine.
2:4 dinitro 4'hydroxydiphenylamine.
2:4 dinitro 3'methoxydiphenylamine.
2:4 dinitro 4'amidodiphenylamine.
2:4 dinitro 4'chlordiphenylamine.
2:4 dinitrophenyl betanaphthylamine.
2:4 dinitrophenyl 4'tolylamine.
4 mononitro diphenylamine.
4 nitrophenyl 4'tolylamine.
4 chlor 2 nitrodiphenylamine.
4 nitro 4'chlordiphenylamine.
4 chlor 2 nitro 4'amino diphenylamine.
4 chlor 2 nitro 4'methoxy diphenylamine.
4 chlor 2 nitro 4'hydroxy diphenylamine.
4 chlor 2 nitro 3'amino diphenylamine.
4:4' dinitrodiphenylamine.
4:4' dinitro 3'hydroxydiphenylamine.
4 nitrophenyl 4'nitro 2'tolylamine.
2:4' dinitrodiphenylamine.

Such compounds impart to cellulose acetate colorations varying from pure greenish yellows to golden yellow and orange or brown and which in many cases show very good resistance to light, soaping, organic or mineral acids, alkalies, ironing etc.

Many of the nitro derivatives of diarylamines herein referred to are insoluble, or of only relatively low solubility in water, dilute acids or dilute alkalies.

The unsulphonated nitro derivatives of diarylamines may be applied to the goods of or containing cellulose acetate by any suitable method. More particularly they may be applied in solubilized or colloidally dispersed forms prepared by the method indicated in British patent specification 219,349 and my United States specification Serial No. 664,780 corresponding thereto, namely by pretreatment of them with solubilizing agents of the class indicated in the said British and United States specifications, that is to say sulphoricinoleic or other sulphated fatty acids or other bodies having oily or fatty characteristics, namely higher fatty acids or sulphonated or other derivatives thereof containing salt forming groups, or with salts of such acids or bodies, for instance their alkali or ammonium salts, or with a mixture of two or more of these solubilizing agents. Corresponding to what is stated in the said specifications, the solubilizing of the unsulphonated nitro derivatives of diarylamines may be effected by stirring up or treating them with one or more of the said solubilizing agents, heating if necessary, and the mass can be afterwards diluted with water or aqueous alkali, filtered if required, and added to the dye-baths. Solid "solutions" or concentrated solubilized preparations of the unsulphonated nitro derivatives of diarylamines may be made by heating them with the body or bodies of oily or fatty characteristics, for instance oleic, stearic, palmitic or sulphoricinoleic acid etc. (or their salts), either by treatment in presence of little or no water, or by treatment in presence of larger quantities of water with subsequent concentration or drying. The concentrated solubilized preparations may be diluted with hot water and added to the dyebath.

For printing and stenciling, the solubilized modifications of the unsulphonated nitro derivatives of diarylamines obtained by pretreating them as before mentioned with one or more solubilizing agents of the class referred to may be dissolved in water and thickened with starch, gums, dextrin, flour or the like to form the necessary pastes.

As before stated, said class of solubilizing agents comprises sulphoricinoleic or other sulphated fatty acids or other bodies having oily or fatty characteristics, namely higher fatty acids or sulphonated or other derivatives thereof containing salt forming groups, and also salts of such acids or bodies, for instance their alkali or ammonium salts, and for simplicity the said solubilizing agents, including the salts, are in the claims all included in the term body of oily or fatty characteristics.

The unsulphonated nitro derivatives of diarylamines may also be applied to the goods of or containing cellulose acetate, in solubilized or colloidally dispersed forms, prepared by the method indicated in the specification of British Patent No. 224,925 and my United States specification Serial No. 664,781 corresponding thereto, namely by pretreatment of them with solubilizing agents or mixtures of the category indicated in these said other British and United States specifications, that is to say with carbocyclic compounds containing in their structure one or more salt forming groups or sodium or other salts of said compounds, or mixtures of such carbocyclic compounds or salts, or mixtures of one or more thereof with one or more of the above mentioned solubilizing agents of said British specification 219,349 or said United States specification Serial No. 664,780; instances of such carbocyclic compounds are, as mentioned in the British specification 224,925 and United States specification Serial No. 664,781, naphthenic acids, naphthene-sulphonic acids or other carboxylic or sulphonic acids of the cyclo-paraffins, phenols, sulphonic acids, carboxylic acids, phenol sulphonic acids or other derivatives of the benzene, naphthalene or anthracene series, or other derivatives of saturated or non-saturated cyclic hydrocarbons containing one or more salt-forming groups, or sodium or other salts of any of such compounds.

The solubilization of the unsulphonated nitro derivatives of diarylamines with the solubilizing agents or mixtures of the category indicated can be effected similarly to the solubilization with the solubilizing agents of the class first above mentioned, and the solubilized forms or modifications may be similarly applied to the goods.

The solubilization or colloidal dispersion methods above mentioned may be employed in particular for the application of those of the unsulphonated nitro derivatives of diarylamines which are insoluble or of relatively low solubility in water, dilute acids or dilute alkalies, but said methods may also be employed with those which are soluble or relatively soluble in water, dilute acids or dilute alkalies. The solubilized or colloidally dispersed preparations of the unsulphonated nitro derivatives of diarylamines may be added to the dyebaths or to thickened aqueous solutions or preparations intended to be used in application by printing or stencilling.

While the said unsulphonated nitro derivatives of diarylamines may be applied more particularly in solubilized or colloidally dispersed forms prepared according to the methods above mentioned they may be applied in any other suitable way. For example they may be very finely ground and suspended in aqueous baths or pastes, which may or may not be acidified or rendered alkaline, and to which may or may not be added protective colloids such as glue, starch, gums and the like; or the suspension may be formed by first dissolving in a suitable organic solvent and then pouring into the dyebath to which protective colloids such as those above mentioned, or others, may or may not have been previously added.

The nitro derivatives of diarylamines hereinbefore referred to may be employed for the dyeing, printing or stencilling of mixed yarns, fabrics or materials containing cellulose acetate fibres, filaments or yarns associated with other materials, for example cotton or other yarns or fibres of the cellulose type (natural or artificial), wool, silk, and so forth. Usually the said nitro derivatives show more or less complete resist to cotton and only slightly tint silk and wool. Thus mixed goods can be dyed, stencilled or printed to show resist, differential or solid effects as desired, appropriate dyes or coloring agents being applied if desired or required for the non-acetate portion of the mixed material, either separately or simultaneously with the nitro derivatives of diarylamines.

The following are some examples of the manner in which the invention may be performed it being understood that these are given only by way of illustration and can be varied widely without departing from the invention.

*Example 1.*

5 lb. 20% aqueous paste of 2:4 dinitro-4'hydroxydiphenylamine are heated with 7½ lb. 65% aqueous ammonium sulphoricinoleate until the mass is as homogeneous as possible. Boiling water is then added and the resultant liquor made up to 12 gallons bulk, well stirred and then added, through a sieve if desired, to a suitable dye machine containing 200 gals. of soft water. This dilute aqueous dye liquor resulting will serve for the dyeing of a brilliant full gold shade on 100 lb. of cellulose acetate yarn in the form of hanks, either by a treatment throughout at a suitable elevated temperature, say 65°–75° C. or by the variant method of dyeing, starting at a low temperature and gradually raising until the desired depth is achieved. When this point is reached the goods are rinsed and may be further treated, dried and finished as desired or requisite.

*Example 2.*

By replacing throughout in Example 1 the 2:4 dinitro-4'hydroxydiphenylamine by 2:4 dinitro 4'dimethylaminodiphenylamine, otherwise carrying out the whole in precisely the same manner a medium shade of brownish gold may be produced on 100 lb. of cellulose acetate yarn similarly in the form of hanks.

*Example 3.*

2 lb. 2-nitro-4-chlordiphenylamine 33% aqueous paste are ground up with 6 lb. of 50% aqueous sodium sulphoricinoleate and the mass then heated until as uniform as possible. 12 gals. of a 2½% boiling aqueous solution of sodium oleate is then added and the whole liquor stirred well. This is then added through a sieve to the beck of a dye jig and will then serve for the production by ordinary methods of dyeing with this machine of a golden yellow shade, very fast to light, on 50 lb. of woven fabric composed of cellulose acetate yarns.

*Example 4.*

1½ lb. of 4-chlor-2-nitro-4' aminodiphenylamine 100% fine powder is well pasted up with 12 lb. of 60% potassium sulphoricinoleate and the whole heated until as well dissolved or intimately mixed as possible. This preparation is then diluted with 20 gals. of boiling soft water and the liquor stirred, and passed through a sieve into a dyebath containing 250 gals. of soft water at 50° C., 100 lb. of cellulose acetate knitted fabric is introduced and worked for 2 hours, the temperature being raised to 80° C. After dyeing the goods are rinsed and finished as desired. The treatment yields a good shade of golden or orange brown of considerable fastness to soaping.

*Example 5.*

1 lb. of finely divided 4-chlor-2-nitro 4'hydroxydiphenylamine is pasted with 9 lb. of naphthenic acid which has been rendered slightly alkaline with ammonia and a small quantity of water to ensure good dispersion and the mixture is heated. To this, 10 gals. of boiling 2% soap solution are added and well stirred to give as good a dispersion as possible. This liquor is then poured with sieving if desirable, into a bath containing 200 gals. of soft water. 100 lb. of cellulose acetate silk in the form of yarn (previously scoured off) is entered and dyeing carried out in the usual manner, the temperature being raised to 80° C. during 1½ hours. When the requisite shade of reddish yellow is obtained the goods are lifted and washed off in warm water, dried and finished in the usual manner.

*Example 6.*

4 oz. of 4:4' dinitrodiphenylamine 100% powder are finely ground and then pasted intimately with 3½ lb. of 45% aqueous sodium sulphoricinoleate until as homogeneous as possible. 7 gals. of boiling 2% sodium stearate solution are then added and the whole liquor further boiled with stirring. This is then added to an ordinary open vat containing about 60 gallons of soft water at 35° C. 25 lb. of cellulose acetate yarns in the form of hanks are entered and worked for 1½ hours, the temperature being raised by suitable means throughout to attain a maximum of 80° C. When the resultant shade of bright greenish yellow is of the desired depth the goods are rinsed, dried and finished as requisite.

*Example 7.*

8 oz. 4:2' dinitrodiphenylamine 100% powder are finely ground and then pasted intimately with 3½ lb. potassium palmitate 75% until as homogeneous as possible. 7 gals. of boiling 2% sodium stearate solution are then added and the whole liquor further boiled with stirring. This is then added to an ordinary open vat containing about 90 gals. of soft water at 35° C. 45 lb. of cellulose acetate yarns in the form of hanks are entered and worked for 1½ hours, the temperature being raised by suitable means throughout to attain a maximum of 80° C. When the resultant shade of bright greenish yellow is of the desired depth the goods are rinsed, dried and finished as requisite.

*Example 8.*

20 lb. of 4:4' dichlor-2-nitrodiphenylamine 10% aqueous paste are finely ground in a suitable mill or apparatus until substantially all particles are reduced below .0001". The thin paste resulting is diluted with 5 gals. boiling soft water and poured direct into a vat or a suitable dye machine containing 200 gals. hard water to which has been added a solution of 6 lb. of finely powdered glue in a sufficiency of boiling water. 100 lb. of knitted fabric of cellulose acetate is then entered cold and dyeing proceeded with for 3 hours, the temperature being carefully raised until a maximum temperature of 85° C. is reached. The resultant shade is golden yellow. The fabric is now removed, rinsed, dried and finished as desired.

*Example 9.*

15 lb. of 4:4' dinitro-2' hydroxydiphenylamine 15% paste are finely ground in a suitable mill or apparatus until substantially all particles are reduced below .0001". The thin paste resulting is diluted with 5 gals. boiling soft water and poured direct into a vat or a suitable dye machine containing 250 gals. soft water to which has been added 12 gals. of a boiling aqueous solution containing 4 lb. of gelatine and 4 lb. of dextrine. 100 lb. of knitted fabric of cellulose acetate is then entered cold and dyeing proceeded with for 3 hours, the temperature being carefully raised until a maximum temperature of 85° C. is reached. The dyeing may be continued until the resultant golden yellow is the requisite depth. The fabric is removed, rinsed, dried and finished as desired.

*Example 10.*

To dye a shade of lemon yellow on the cellulose acetate component and a shade of violet on the cotton component on 50 lb. of woven mixed fabric containing 60% of its weight cotton constituting the warp, and 40% of its weight cellulose acetate constituting the weft. The fabric is rolled up, scoured as desired, and placed in position on the dye jig as is customary for woven fabrics. The beck is then charged with 50 gallons of soft water included in which are the following two liquors:—

(a) Made by grinding up 12 oz. of 2:4 dinitrodiphenylamine with 1½ lb. of 50% sodium sulpho ricinoleate, then heating the mass until the maximum homogeneity is reached, afterwards pouring on to this 10 gals. of boiling 2% aqueous solution of sodium oleate and stirring well.

(b) Made by dissolving 1½ lb. of the sodium salt of dimethoxydiphenyldisazo-4-sulpho - 1:7 - dihydroxynaphthalene - metatoluylenediamine in 15 gals. of boiling soft water.

Dyeing is conducted in the usual manner with this type of machine when the dinitrodiarylamine body is abstracted almost exclusively by the cellulose acetate and the dyestuff body mentioned under (b) above almost exclusively by the cotton. When the dyeing has been conducted sufficiently long and the temperatures raised so that the desired depth of shade on each component is achieved, the pieces are washed off, dried, stretched, and finished as requisite.

*Example 11.*

To dye a black on the tussah silk component and a golden yellow on the cellulose acetate component of 100 lb. of a tubular knitted fabric composed of 50% of each fibre. An ordinary dye machine for these types of fabric fitted with a reel or winch suitable for the above quantity is charged with 250 gallons soft water at 80° C. Into this is poured 12 gallons of a boiling liquor prepared with 2:4 dinitro 4' hydroxydiphenylamine exactly as in Example 1. The mixed fabric, after previous scouring, is entered and worked, maintaining the temperature until the cellulose acetate has assumed the requisite depth of golden yellow. The bath is then run off and the goods washed in warm water and a fresh liquor is then prepared with a similar quantity of water, to which is added a solution made by dissolving 4 lb. of the sodium salt of 5-sulpho-alphanaphthalene - azo - alphanaphthalene azophenylalphanaphthylamine,-8-sulphonic acid in 20 gals. of boiling water. This bath is acidified with ½% formic acid (100% strength) calculated on the weight of goods and with 5% ordinary Glauber salts. The dyeing is carried out in the ordinary manner excepting that the temperature is not raised above 80°–85° C. A little fresh acid may be added if desired. When the necessary depth of shade on the tussah silk has been achieved the goods are rinsed, dried, dressed and finished as may be requisite.

What I claim and desire to secure by Letters Patent is:—

1. Process for dyeing yarns, fabrics and other materials comprising cellulose acetate, said process comprising applying to the material an unsulphonated nitro derivative of a diarylamine.

2. Process for dyeing yarns, fabrics and other materials comprising cellulose acetate, said process comprising applying to the material an unsulphonated nitro derivative of a diarylamine, said derivative being applied in the form of a solubilized modification obtained by pretreatment with a solubilizing agent comprising a body of oily or fatty characteristics.

3. Process for dyeing yarns, fabrics and other materials comprising cellulose acetate, said process comprising applying to the material an unsulphonated dinitro derivative of a diarylamine.

4. Process for dyeing yarns, fabrics and other materials comprising cellulose acetate, said process comprising applying to the material an unsulphonated dinitro derivative of a diarylamine, said derivative being applied in the form of a solubilized modification obtained by pretreatment with a solubilizing agent comprising a body of oily or fatty characteristics.

5. Process for dyeing yarns, fabrics and other materials comprising cellulose acetate, said process comprising applying to the material an unsulphonated 2:4 dinitro derivative of a diarylamine.

6. Process for dyeing yarns, fabrics and other materials comprising cellulose acetate, said process comprising applying to the material an unsulphonated 2:4 dinitro derivative of a diarylamine, said derivative being applied in the form of a solubilized modification obtained by pretreatment with a solubilizing agent comprising a body of oily or fatty characteristics.

7. Process for dyeing yarns, fabrics and other materials comprising cellulose acetate, said process comprising applying to the material 2:4 dinitro 4′ hydroxydiphenylamine.

8. Process for dyeing yarns, fabrics and other materials comprising cellulose acetate, said process comprising applying to the material 2:4 dinitro 4′ hydroxydiphenylamine the 2:4 dinitro 4′ hydroxydiphenylamine being applied in the form of a solubilized modification obtained by pretreatment with a solubilizing agent comprising a body of oily or fatty characteristics.

9. Process for dyeing "mixed" yarns, fabrics and other materials, comprising cellulose acetate associated with other fibre, said process comprising applying to the mixed material an unsulphonated nitro derivative of a diarylamine.

10. Process for dyeing "mixed" yarns, fabrics and other materials comprising cellulose acetate associated with other fibre, said process comprising applying to the mixed material an unsulphonated nitro derivative of a diarylamine, said derivative being applied in the form of a solubilized modification obtained by pretreatment with a solubilizing agent comprising a body of oily or fatty characteristics.

11. Process for dyeing "mixed" yarns, fabrics and other materials comprising cellulose acetate associated with other fibre, said process comprising applying to the mixed material an unsulphonated nitro derivative of a diarylamine for which said other fibre has less affinity than the cellulose acetate.

12. Process for dyeing "mixed" yarns, fabrics and other materials comprising cellulose acetate associated with other fibre, said process comprising applying to the mixed material an unsulphonated nitro derivative of a diarylamine for which said other fibre has less affinity than the cellulose acetate, said derivative being supplied in the form of a solubilized modification obtained by pretreatment with a solubilizing agent comprising a body of oily or fatty characteristics.

13. Process for dyeing "mixed" yarns, fabrics and other materials comprising cellulose acetate associated with other fibre, said process comprising applying to the mixed material an unsulphonated nitro derivative of a diarylamine for which said other fibre has less affinity than the cellulose acetate, and subsequently applying to the material a coloring matter appropriate for said other fibre.

14. Process for dyeing "mixed" yarns, fabrics and other materials comprising cellulose acetate associated with other fibre, said process comprising applying to the mixed material an unsulphonated nitro derivative of a diarylamine for which said other fibre has less affinity than the cellulose acetate, said derivative being applied in the form of a solubilized modification obtained by pretreatment with a solubilizing agent comprising a body of oily or fatty characteristics, and subsequently applying to said material a coloring matter appropriate for said other fibre.

15. Process for dyeing "mixed" yarns, fabrics and other materials comprising cellulose acetate and cotton, said process comprising applying to the mixed material an unsulphonated nitro derivative of a diarylamine.

16. Process for dyeing "mixed" yarns, fabrics and other materials comprising cellulose acetate and cotton, said process comprising applying to the mixed material an unsulphonated nitro derivative of a diarylamine, said derivative being applied in the form of a solubilized modification obtained by pretreatment with a solubilizing agent comprising a body of oily or fatty characteristics.

17. Process for dyeing "mixed" yarns, fabrics and other materials comprising cellulose acetate and cotton, said process comprising applying to the mixed material an unsulphonated nitro derivative of a diarylamine, and subsequently applying to said material a coloring matter appropriate for the cotton.

18. Process for dyeing "mixed" yarns, fabrics and other materials comprising cellulose acetate and cotton, said process comprising applying to the mixed material an unsulphonated nitro derivative of a diarylamine, said derivative being applied in the form of a solubilized modification obtained by pretreatment with a solubilizing agent comprising a body of oily or fatty characteristics, and subsequently applying to said material a coloring matter appropriate for the cotton.

19. Yarns, fabrics and other materials, comprising cellulose acetate dyed with an unsulphonated nitro derivative of a diarylamine.

20. Yarns, fabrics and other materials comprising cellulose acetate dyed with an unsulphonated dinitro derivative of a diarylamine.

21. Yarns, fabrics and other materials comprising cellulose acetate dyed with an unsulphonated 2:4 dinitro derivative of a diarylamine.

In testimony whereof I have hereunto subscribed my name.

GEORGE HOLLAND ELLIS.